US012525855B2

United States Patent
Miah et al.

(10) Patent No.: US 12,525,855 B2
(45) Date of Patent: Jan. 13, 2026

(54) METHODS AND CIRCUITS FOR LINE SYNCHRONIZATION DURING TRANSITION OF AN ELECTRIC MOTOR BETWEEN VARIABLE FREQUENCY INVERTER POWER AND LINE FREQUENCY POWER

(71) Applicant: Regal Beloit America, Inc., Beloit, WI (US)

(72) Inventors: Md Naim Miah, Fort Wayne, IN (US); Michael R. Koller, Columbia City, IN (US); Ludovic Andre Chretien, Columbia City, IN (US); Mehrzad Mohammadi Bijaieh, Fort Wayne, IN (US)

(73) Assignee: Regal Beloit America, Inc., Milwaukee, WI (US)

( * ) Notice: Subject to any disclaimer, the term of this patent is extended or adjusted under 35 U.S.C. 154(b) by 278 days.

(21) Appl. No.: 18/322,911

(22) Filed: May 24, 2023

(65) Prior Publication Data

US 2024/0396409 A1   Nov. 28, 2024

(51) Int. Cl.
*H05K 7/20*     (2006.01)
*F25B 49/02*    (2006.01)
*H02K 11/33*    (2016.01)
*H02P 27/06*    (2006.01)

(52) U.S. Cl.
CPC ............ *H02K 11/33* (2016.01); *F25B 49/022* (2013.01); *F25B 49/025* (2013.01); *H02P 27/06* (2013.01)

(58) Field of Classification Search
CPC ..... H02K 11/33; F25B 49/022; F25B 49/025; H02P 27/06
See application file for complete search history.

(56) References Cited

U.S. PATENT DOCUMENTS

| 2,589,277 | A | 3/1952 | Samuel |
| 10,554,157 | B2 | 2/2020 | Chretien |
| 10,840,830 | B2 | 11/2020 | Chretien |
| 2008/0174257 | A1* | 7/2008 | Schnetzka .......... H05K 7/20936 318/434 |
| 2013/0087319 | A1* | 4/2013 | Havard .................... F24F 11/77 29/890.03 |
| 2022/0341434 | A1 | 10/2022 | Chretien |

* cited by examiner

*Primary Examiner* — Cortez M Cook
(74) *Attorney, Agent, or Firm* — Armstrong Teasdale LLP

(57) ABSTRACT

A system including an electric motor of a compressor system and a controller is disclosed. The electric motor includes an inverter and a contactor to operate the electric motor at variable frequency power and line frequency power, respectively. The controller is configured to determine that the electric motor needs to be operated using the line frequency power instead of the variable frequency power in accordance with a load condition on the system. The controller is configured to determine a time to generate a signal to close the contactor by energizing a coil of the contactor, and initiate transition of the electric motor to operate using the line frequency power instead of the variable frequency power by applying the signal to close the contactor at the determined time.

18 Claims, 6 Drawing Sheets

METHODS AND CIRCUITS FOR LINE SYNCHRONIZATION DURING TRANSITION OF AN ELECTRIC MOTOR BETWEEN VARIABLE FREQUENCY INVERTER POWER AND LINE FREQUENCY POWER

FIELD

The field of the disclosure relates generally to an electric motor, and specifically to a motor controller controlling a drive circuit for seamless transition of the electric motor from using variable frequency inverter power to line frequency power.

BACKGROUND

At least some known electric motors are fixed speed motors that operate most efficiently at line frequency power. Such motors exhibit uncontrolled acceleration during startup. Further, at low load conditions, such motors operate less efficiently. Alternatively, some induction motors may be driven with a variable speed motor controller to adapt motor speed or torque output to a load level. Such configurations are generally limited by power factor, electromagnetic interference, and electrical losses.

A drive circuit for certain motors enables efficient operation at both high and low load conditions. For example, a motor operating a compressor in a heating, ventilation, and air conditioning (HVAC) system may experience high load conditions during peak temperatures and low load conditions during milder temperatures. At least some drive circuits operate the motor using an inverter under low load conditions and operates the motor using line frequency power under high load conditions.

Transitioning from using an inverter to supplying line frequency power presents significant challenges. For example, compressors may stall or experience significant loss of speed within one line cycle. Further, a contactor closing to connect a motor to line frequency power may require between one- and two-line cycles to open/close, thereby causing the motor to stall or experience significant loss of speed during the opening/closing. Further, the contactor and inverter cannot operate at the same time because of the risk of damage to the inverter due to line to direct current (DC) bus short circuit.

BRIEF DESCRIPTION

In one aspect, system including an electric motor of a compressor system and a controller is disclosed. The electric motor includes a contactor configured to provide line frequency power to the electric motor to drive the electric motor at a full speed, and an inverter to provide variable frequency power to the electric motor to drive the electric motor at a variable speed. The controller is configured to determine that the electric motor needs to be operated using the line frequency power instead of the variable frequency power from the inverter in accordance with a load condition on the system. The controller is configured to determine a time to generate a signal to close the contactor by energizing a coil of the contactor, and initiate transition of the electric motor to operate using the line frequency power instead of the variable frequency power from the inverter by applying the signal to close the contactor at the determined time.

In another aspect, a controller of an electric motor is disclosed. The controller is configured to determine that the electric motor needs to be operated using a line frequency power instead of a variable frequency power from an inverter of the electric motor. The controller is configured to determine a time to generate a signal to close a contactor of the electric motor by energizing a coil of the contactor. The controller is configured to initiate transition of the electric motor to operate using the line frequency power instead of the variable frequency power from the inverter by applying the signal to close the contactor at the determined time.

In yet another aspect, a method is disclosed. The method includes determining that an electric motor needs to be operated using a line frequency power instead of a variable frequency power from an inverter of the electric motor. The method includes determining a time to generate a signal to close a contactor of the electric motor by energizing a coil of the contactor, and causing transition of the electric motor to operate using the line frequency power instead of the variable frequency power from the inverter by applying the signal to close the contactor at the determined time.

DETAILED DESCRIPTION

Figure 1:
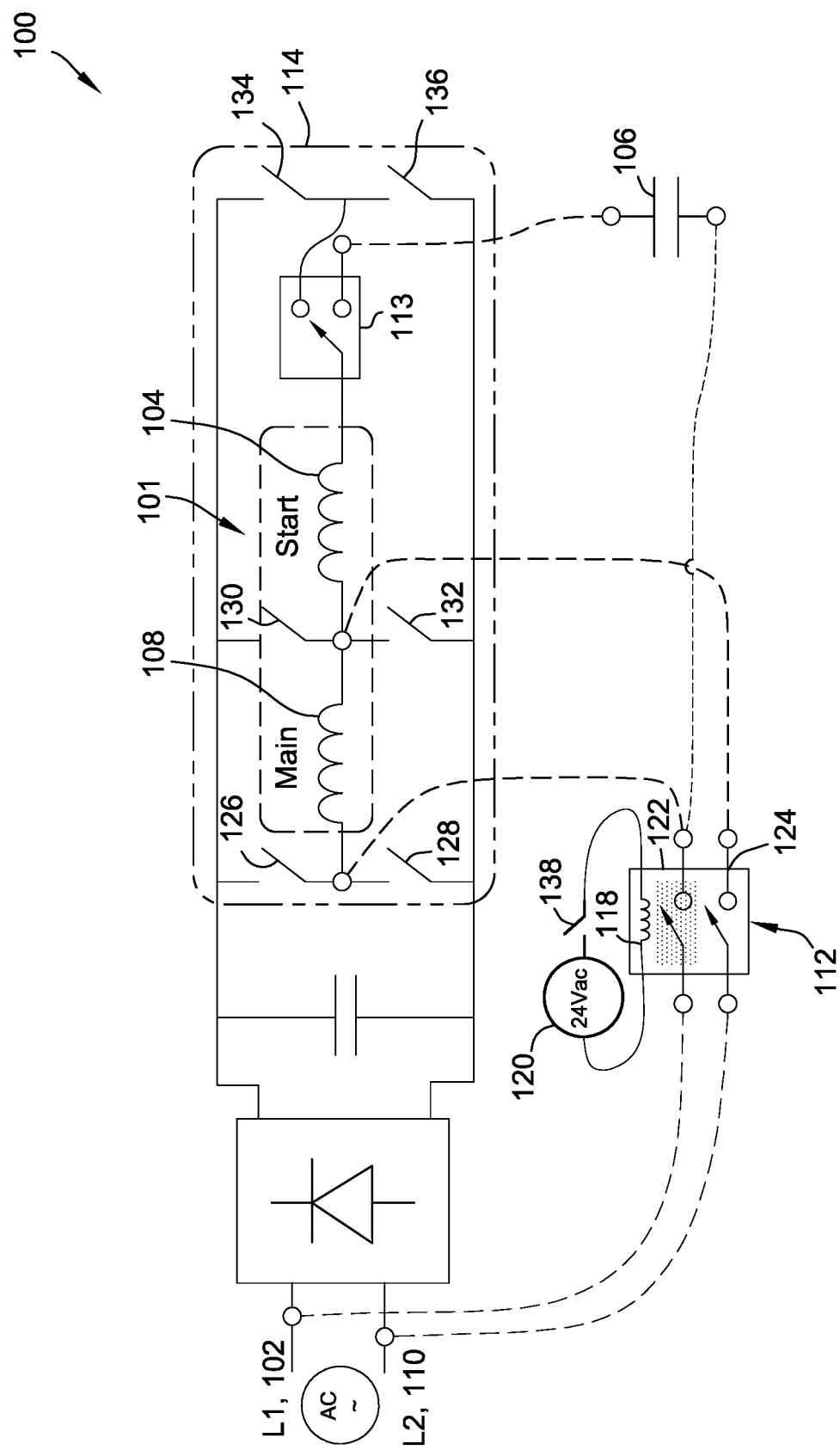
FIG. 1 is a schematic diagram of a known drive circuit for an electric motor.

In operating an electric motor (e.g., and a mechanical compressor, a fan, a blower, a pump, a household appliance, and so on, driven by the electric motor), a drive circuit for the electric motor drives the electric motor with an inverter under low load conditions and with line frequency power under high load conditions. Generally, the inverter and line frequency power cannot both be connected to the electric motor at the same time, because of the potential for a line-to-line short circuit. To transition from inverter to line, or line to inverter, one is disconnected before connecting the other.

When transitioning from the inverter to line frequency power, a contactor closing to connect a motor to line frequency power may require between one- and two-line cycles (or nearly two-line cycles) to open/close, thereby causing the motor to stall or experience significant loss of speed during the opening/closing. Further, the contactor and inverter cannot operate at the same time because of the risk of creating a line-to-line short circuit.

Accordingly, the drive circuit described herein is in communication with at least one controller (e.g., a motor controller, a system controller, etc.) that controls, using a line synchronization circuit and during the transition from the inverter power to line frequency power, power supply to the motor during the above-mentioned contactor closing delay without requiring the use of costly and space-taking additional solid-state switches such as TRIACs. Various examples of the line synchronization circuitry are described in U.S. patent application Ser. No. 17/860,945 filed on Jul. 8, 2022. Contents of the U.S. patent application Ser. No. 17/860,945 are incorporated herein by reference for all purposes.

In some examples, a line synchronization circuit is not used for transition from the inverter power to the line frequency power. But instead, transition from the inverter power to the line frequency power is performed, via an intelligent power module (IPM) with an alternate switching pattern. The alternate switching pattern is designed to avoid line to drive short circuit (in other words, closing of a contactor to power the electric motor using the line frequency power while the inverter is also switched on), and to maintain a speed of the electric motor during the transition avoiding stalling of the motor.

Transition from the inverter power to the line frequency power may be adversely affected by operating conditions such as a temperature, a line voltage value, and/or line power value, a contactor coil voltage value, and so on. Various algorithms described herein may enable seamless transition from the inverter power to the line frequency power under extreme operating conditions for a successful air-conditioning, heating, and refrigeration institute (AHRI) certification.

In some examples, in order to maintain a speed of the electric motor during transition from the inverter power to the line frequency power, an amplitude of a voltage or an electric current that is fed to a main winding of the motor during at least one last full cycle prior to transition is updated (for example, increased), and an amplitude of a voltage or an electric current that is fed to a start winding, in at least one half cycle before the start winding is disabled, is also updated (for example, increased). Such a boost or an increase in the voltage or the current fed to the main winding and the start winding during the last cycle before transition from the inverter power to the line frequency power limits speed reduction during the transition. An amount of voltage or current increase, an exact timing of the voltage or current increase, disabling the start winding from using the inverter power, and exact timing to turn on a contactor are determined to avoid speed reduction during the transition under extreme operating conditions.

Closing time of a contactor generally varies with operating conditions, including but not limited to, an ambient temperature, a system temperature (e.g., temperature of a controller), voltage, value of a contactor coil/line impedance, and/or an age of the contactor (or an amount of wearing of the contactor), delays associated with moving mechanical elements of the contactor, and so on. Each time when the contactor is closed, details (or data) corresponding to the operating conditions present at that time, and the contactor closing time and a delay in closing the contactor after a contactor coil is energized are monitored and used to adjust a time at which the contactor coil is energized based on the present operating conditions. The closing time of the contactor is determined based on a time at which a sensor (for example, a line current sensor) detects flow of an electrical current through the contactor. Accordingly, an analysis is executed using the previous details of the operating conditions, a time to energize a contactor coil is determined such that speed reduction during the transition is avoided.

Various methods to detect closing of a contactor are also described to prevent the contactor being closed and the inverter providing power to the motor at the same time, and thereby causing damage to the inverter.

Various embodiments are described with respect to FIG. 1 to FIG. 5 below.

FIG. 1 is a schematic diagram of a known drive circuit 100 for an electric motor 101, such as a PSC motor. During normal line frequency operation, line frequency current, such as 50 Hertz or 60 Hertz, for example, is supplied on a first line, or L1, 102, through a run capacitor 106, to a start winding 104, and to a main winding 108. A second line, or L2, 110 provides a return, or neutral, for the line frequency current. The drive circuit 100 includes a contactor 112 for connecting and disconnecting the L1 102 and the L2 110 to the electric motor 101. The contactor 112 is a two-pole electromechanical contactor that is commutated by energizing a coil 118 connected to a 24 Vac power supply 120 via a coil control switch 138 connected in series with the coil 118 and the 24 Vac power supply 120. In certain embodiments, the run capacitor 106 may be coupled to the L1 102 on either side of the contactor 112. A relay 113 is coupled between run capacitor 106 and start winding 104.

The drive circuit 100 includes an inverter 114 that is enabled to drive the electric motor 101 with variable frequency power under low load, or at least less than full load, conditions. The drive circuit 100 is supplied line frequency power on the L1 102 and the L2 110. The inverter 114 enables variable speed operation of the electric motor 101 by regulating an amplitude, a phase, and a frequency of alternating current (AC) voltages on output terminals thereof, which are coupled to the main winding 108 and the start winding 104. When operating the electric motor 101 using the inverter 114, the contactor 112 is opened and the inverter 114 is enabled via any suitable control means, e.g., an analog and/or a digital control signal. To transition to line frequency power, the inverter 114 is disabled, the contactor 112 is closed, and the relay 113 is commutated to couple the L1 102 and the L2 110 to the electric motor 101 via the run capacitor 106.

As shown in FIG. 1, the drive circuit 100 includes inverter switches/relays, the contactor 112, and the run capacitor 106. These components contribute to a relatively high cost and complexity of the drive circuit 100. Moreover, the electric motor 101 includes integrated winding connections. In particular, the winding connections between the drive circuit 100 and the windings 104, 108 are integrated or tied, such that at least one connection is coupled to both of the main winding 108 and the start winding 104. Although, the electric motor 101 is illustrated as a PSC motor, it is recognized that the electric motor 101 can be a permanent magnet (PM) motor or an electronically commutated motor (ECM) having integrated windings (e.g., between windings of a three-phase ECM).

The contactor 112, which is a two-pole electromechanical contactor, includes two legs, a first leg 122 and a second leg 124. As described herein, when operating the electric motor 101 using the inverter 114, the contactor 112 is opened (in other words, the first leg 122 and the second leg 124 are opened) and the inverter 114 is enabled using switches 126, 128, 130, 132, 134, and 136, via any suitable control means, e.g., an analog and/or a digital control signal. The inverter 114 provides variable frequency power to the electric motor 101 using a rectifier and a capacitor (shown in FIG. 4A as 408 and 410, respectively).

To transition to line frequency power, the inverter 114 is disabled using the switches 126, 128, 130, 132, 134, and 136, the contactor 112 is closed (in other words, the first leg 122 and the second 124 are closed), and the relay 113 is commutated to couple the L1 102 and the L2 110 directly to the electric motor 101, via the run capacitor 106. To avoid reduction in speed during the transition, in some embodiments, and by way of a non-limiting example, during the at least one last cycle, an amplitude of a voltage or an electric current that is fed to the main winding 108 of the electrical motor 101 during at least one last full cycle prior to transition is updated (for example, increased), and an amplitude of a voltage or an electric current that is fed to the start winding 104, in at least one last half cycle before the start winding is disabled, is also updated (for example, increased). Such a boost or an increase in the voltage or the current fed to the main winding 108 and the start winding 104 during the at least one last cycle before transition from the inverter power to the line frequency power limits speed reduction during the transition. An amount of voltage or current increase, an exact timing of the voltage or current increase, disabling the start winding 104 from using the inverter power, and exact timing to turn on a contactor 112 are determined to avoid speed reduction during the transition under extreme operating conditions. The 1-cycle main boost and ½ cycle start boost are exemplary and may be of shorter or longer duration.

Further, as described herein, while the electric motor 101 is being operated on the inverter 114, the contactor 112 needs to be opened to prevent damage to the inverter 114 from cross conduction from the first leg 122 and/or the second leg 124 being closed/shorted. Also, the coil control switch 138 when closed causes the coil 118 to energize, which causes the first leg 122 and the second leg 124 to close. Accordingly, while the electric motor 101 is being operated on the inverter 114, whether the coil control switch is closed or opened needs to be dynamically (and/or periodically) checked to prevent damage to the inverter 114 from the closed contactor 112 and the enabled inverter 114 at the same time.

Figure 2:
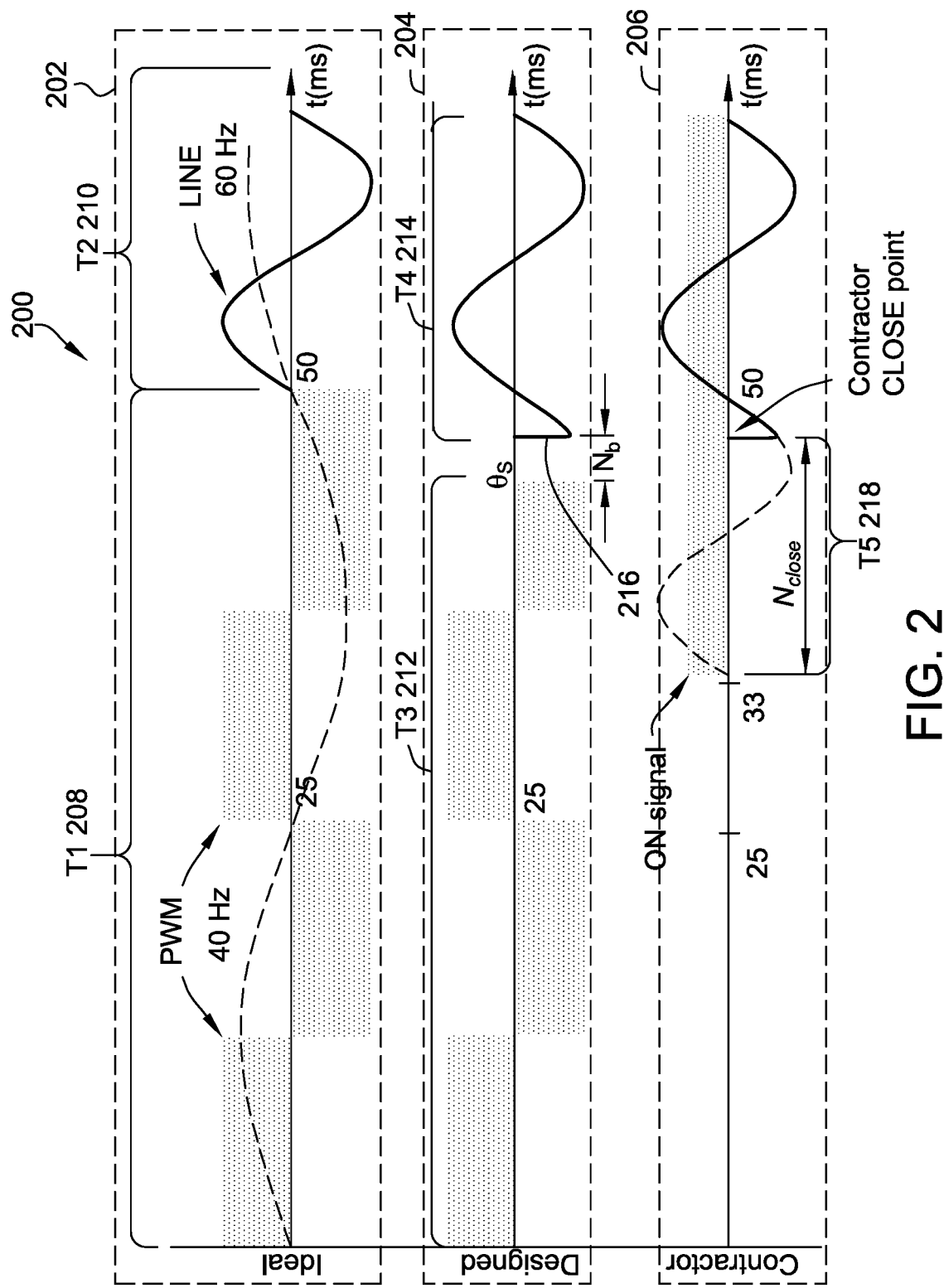
FIG. 2 and FIG. 3 are charts of waveforms.

FIG. 2 illustrates a timing diagram 200 in which a first waveform 202 corresponding to an ideal or a desired scenario, a second waveform 204 corresponding to a practical scenario, and a third waveform 206 are shown along X-axis representing time. During a first period T1 208, the electrical motor 101 is being driven using power from the inverter 114, and during a second period T2 210, the electrical motor 101 is being driven using the line frequency power. A pulse waveform shown during the first period T1 208 opens and closes the switches 126, 128, 130, 132, 134, and/or 136 to drive the electrical motor 101 using the inverter power. A sinusoidal waveform shown during the second period T2 210 represent the line frequency input. The first waveform 202 corresponds with an ideal waveform in which the transition from the inverter power to the line frequency power is immediate without any gap between when the pulse waveform disables the inverter 114 and the sinusoidal waveform through the contactor 112 drives the electrical motor 101.

The second waveform 204 therefore corresponds to driving the electrical motor 101 using the inverter power during a first period T3 212 and using the line frequency power during a second period T4 214. As shown in the second waveform 204, there is a gap $N_b$ 216 between the first period T3 212 and the second period T4 214. The gap $N_b$ 216 is selected to be as minimum as possible.

Further, as described herein, various operating conditions affect actual closing time of the contactor after a signal to energize the coil 118 to close the contactor 112 is sent. As shown in the third waveform 206, a signal to energize the coil 118 is sent at a beginning of a time period T5 218 before the time period T3 212 ends. The time period T5 218 is determined by the controller based on an analysis of the previous details of the operating conditions, and time delay differences corresponding to prior closing of the contactor and a signal to energize the coil 118 is generated or applied.

In some examples, the previous details (or data) of the operating conditions, and time delay differences corresponding to prior closing of the contactor and a signal to energize the coil 118 may be stored in a memory (not shown) communicatively coupled with the controller (not shown). The memory may be a flash memory card, a hard disk, a local database, and/or a database in a cloud, and so on. Additionally, or alternatively, data in the memory may be stored for a specific number of instances corresponding to closing of the contactor. In some examples, the specific number of instances may be user configurable. Alternatively, or additionally, the specific number of instances may depend on available free memory, and so on.

Further, determination of the time period T5 218 based on the analysis of the data of operating conditions, and time delay differences corresponding to prior closing of the contactor and a signal to energize the coil is described below using FIG. 3.

Figure 3:
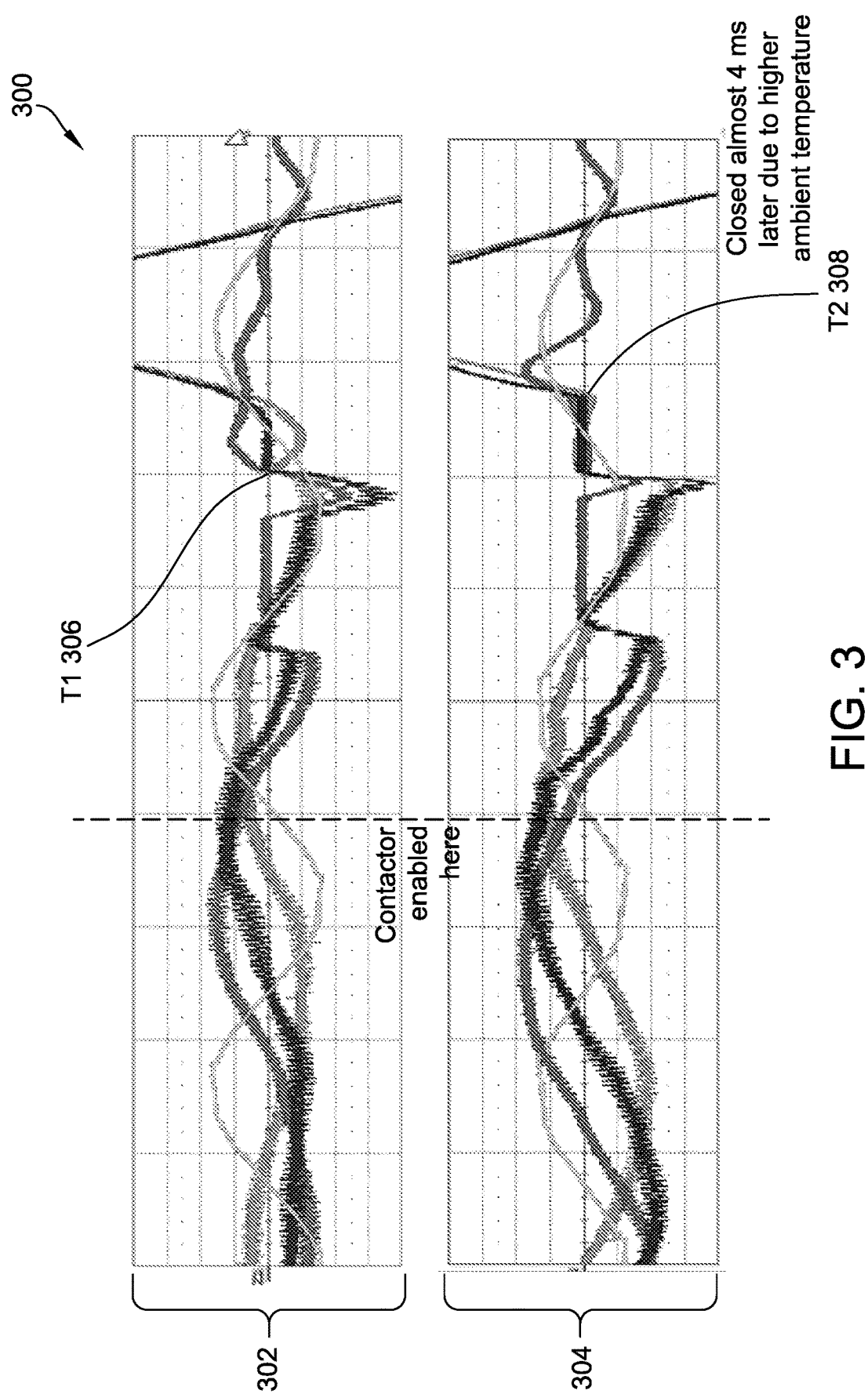

FIG. 3 illustrates a chart 300 of a first group of waveforms 302, and a second group of waveforms 304 showing impact of temperature on closing of the contactor 112 following a signal to energize the coil 118 to close the contactor 112. As shown in FIG. 3, an increase in a temperature (e.g., an ambient temperature, and/or a system controller temperature) causes the contactor 112 to close after an increased delay. As shown in FIG. 3, the contactor 112 closes at a time t1 306 when the temperature is, for example, 74° Fahrenheit, and the contactor 112 closes at a time t2 308 when the temperature is, for example, 125° Fahrenheit. The time t2 308 is later than the time t1 306, for example, due to higher ambient temperature.

Accordingly, in some embodiments, based on the current temperature, and based on the previous data corresponding to how closing time of the contactor is affected based on the temperature values, the controller may determine a value for the time period T5 218. Similarly, data corresponding to a gradual delay in the closing time over time, which corresponds with the aging of the contactor, may also be factored in to determine the value for the time period T5 218. Other operating conditions can similarly be analyzed to determine the value for the time period T5 218. In some embodiments, one or more machine-learning algorithms or prediction algorithms may be used to analyze and predict (or recommend) the value for the time period T5 218.

Figure 4A:
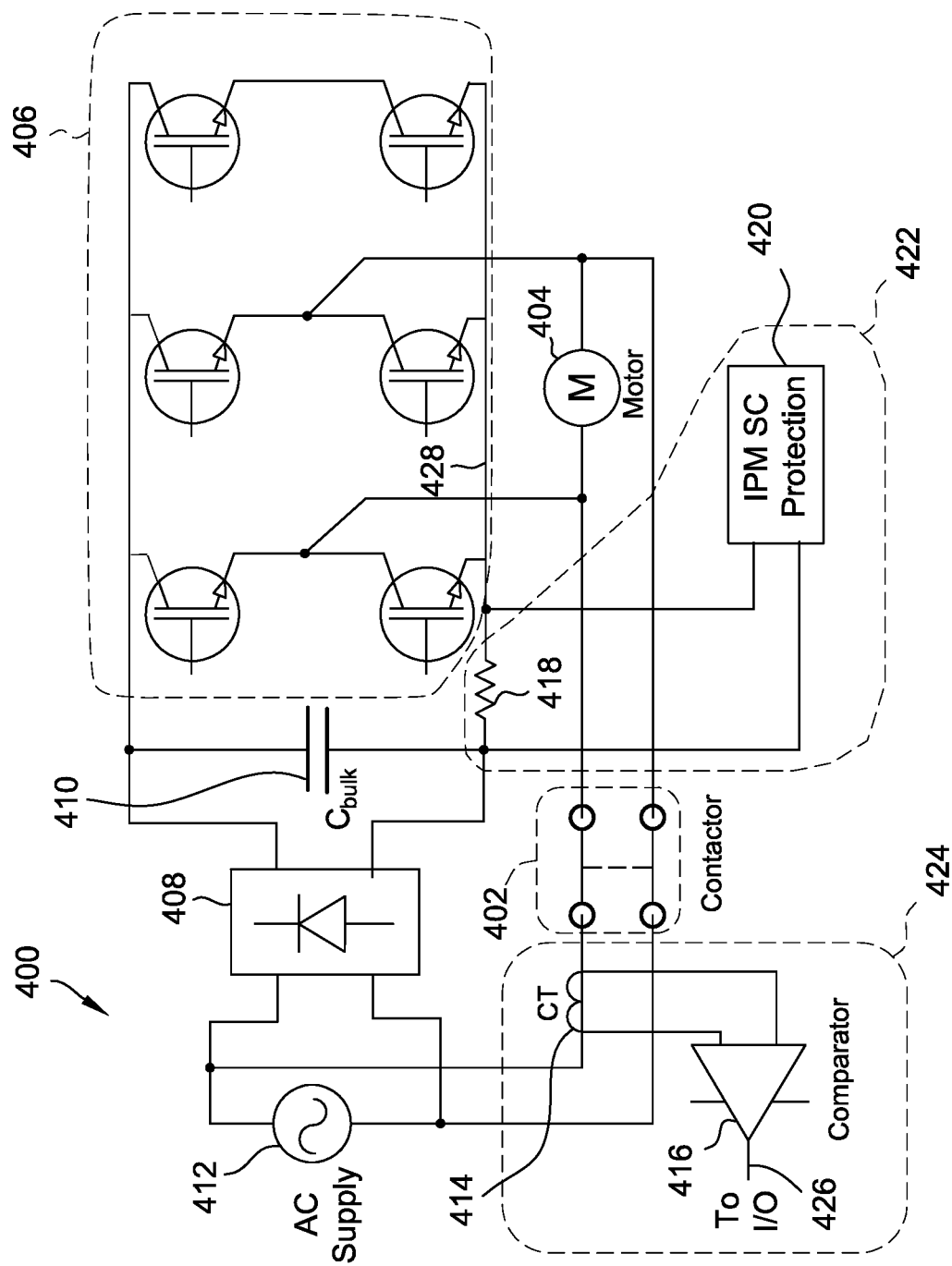
FIG. 4A and FIG. 4B are schematic diagrams of an exemplary drive circuit, in accordance with the present disclosure.
Figure 4B:
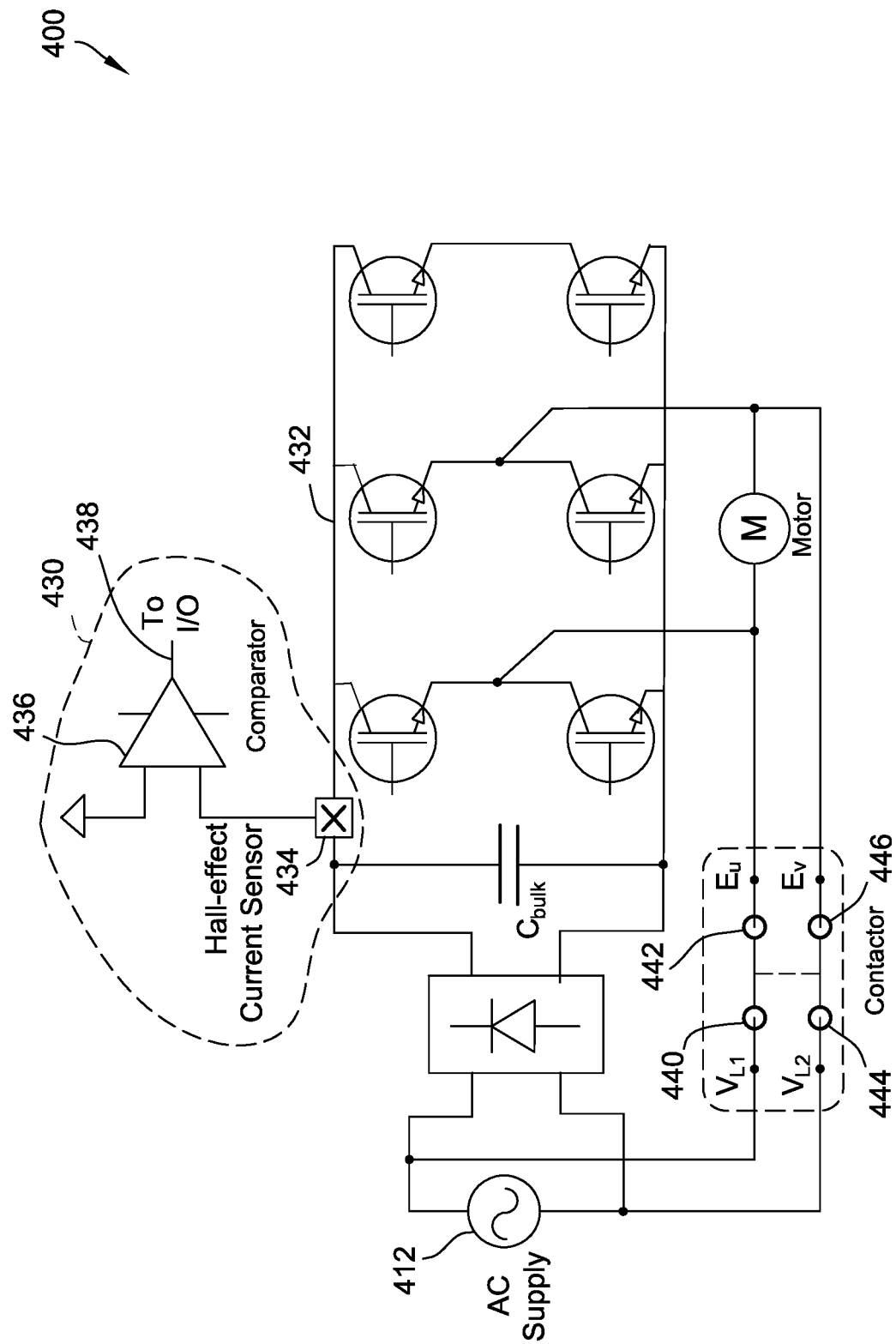

FIG. 4A and FIG. 4B illustrate a schematic diagrams of an exemplary drive circuit 400 providing short circuit protection while transitioning from the inverter power to the line frequency power in accordance with some embodiments, as described herein. The drive circuit 400 shown in FIG. 4A includes an electrical motor 404 (partially shown) that receives power from an inverter 406 when the electrical motor 404 is powered up and during an initial period when a load requirement on the electrical motor 404 is low. The inverter 406 provides variable frequency power to the electric motor through a capacitor 410 and a rectifier 408 connected to an alternating current (AC) supply 412. Later, when the load requirement on the electrical motor 404 increases, the electrical motor is operated using line frequency power. A contactor 402 is closed and the inverter 406 is disabled to transition the electric motor 404 to operate using the line frequency power instead of the inverter power. As described herein, if the contactor 402 is closed while the inverter 406 is enabled, the inverter 406 can be damaged due to a short circuit.

In some embodiments, to prevent damage to the inverter 406 due to a short circuit, an AC line current sensing mechanism 424 is added to the drive circuit 400. The AC line current sensing mechanism 424 includes a current transformer (CT) 414 and a comparator 416. The CT 414 measures an electric current flowing between the AC supply 412 and the contactor 402 when the contactor 402 is closed (or between the AC supply 412 and to the electrical motor 404 through the contactor 402 when the contactor 402 is closed) and provides an input signal to the comparator 416. In this case, since the contactor 402 cannot be closed when the inverter 406 is enabled and providing power to the electrical motor 404, the input signal to the comparator 416 indicating a flow of an electric current through the CT 414 that the contactor 404 is closed, and the inverter 404 needs to be disabled. The comparator 416 provides a signal 426 to a controller (not shown) to disable the inverter 406.

Additionally, or alternatively, in some embodiments, to prevent damage to the inverter 406 due to a short circuit, an IPM short circuit protection mechanism 422 can be used. The IPM short circuit protection mechanism 422 includes a shunt resistor 418 as shown in FIG. 4. The shunt resistor 418 detects flow of an electric current through a lower side of the inverter 406 shown in FIG. 4 as 428. If the electric current flowing through the shunt resistor 418 meets a particular criterion, such as the electric current flowing through the shunt resistor 418 exceeds a threshold current value, an IPM short circuit protection circuit 420 can be activated, which then generates a signal to a controller (not shown) to disable the inverter 406.

Additionally, or alternatively, in some embodiments, to prevent damage to the inverter 406 due to a short circuit, as shown in FIG. 4B, a positive rail short circuit protection mechanism 430 can be added to the drive circuit 400. The positive rail short circuit protection mechanism 430 includes a hall-effect current sensor 434 detecting presence and a magnitude of an electromagnetic field because of an electric current flowing through an upper side of the inverter 406 shown in FIG. 4B as 432. Other types of current sensor may also be used in place of the hall-effect current sensor 434. An output of the hall-effect current sensor 434 is fed as an input to a comparator 436. The comparator 436 generates an output signal 438 to a controller (not shown) to disable the inverter 406, when the electric current flowing the upper side of the inverter 406 shown as 432 meets a particular criterion (e.g., exceeds a threshold current value).

Additionally, or alternatively, in some embodiments, to prevent damage to the inverter 406 due to a short circuit, as shown in FIG. 4B, a voltage difference across points 440 and 442 and/or a voltage difference across points 444 and 446 is measured. The voltage difference of a zero-value across the points 440 and 442, or points 444 and 446, indicates that the contactor 402 is closed, and the inverter 406 needs to be disabled. Similarly, the voltage difference of a non-zero value across the points 440 and 442, or points 444 and 446, indicates that the contactor 402 is opened. Additionally, or alternatively, bouncing of the contactor 402 can be detected using various mechanical and/or software means to determine when the contactor 402 is closed, and accordingly disable the inverter 406.

In the present disclosure, the terms line frequency current, voltage, and/or power are used interchangeably herein to refer to direct electrical communication with an AC source.

Figure 5:
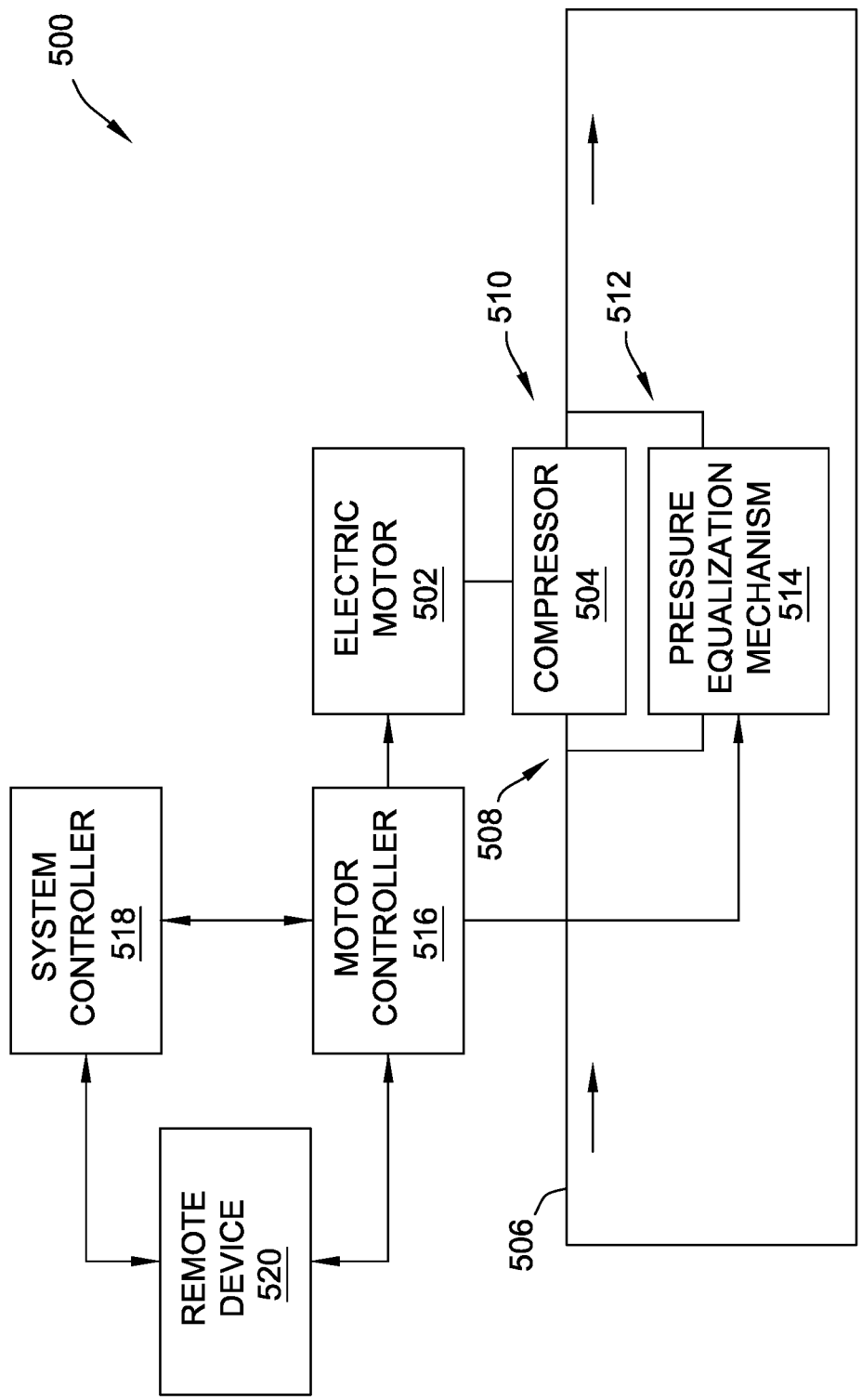
FIG. 5 is a block diagram of a control system for an electric motor in a compressor system.

FIG. 5 is a block diagram of an example compressor system 500 including, for example, an electric motor 502 mechanically coupled to a compressor 504. Electric motor 502 may include, for example, a PM motor or a PSC motor. For example, compressor system 500 may be used with the electric motor and drive circuit shown in FIG. 1. In another example, compressor system 500 may be used with the two-phase electric motor and drive circuit shown in FIG. 4A and FIG. 4B.

Compressor 504 is coupled with a fluid system 506 such as a refrigerant system. Fluid system 506 includes a suction portion 508 and a discharge portion 510 between which a pressure differential can develop during operation of compressor 504. Pressure equalization mechanism 514 may be incorporated internally or externally to compressor 504.

Fluid system 506 also includes a bypass fluid path 512 in which a pressure equalization mechanism 514 is positioned. Pressure equalization mechanism 514 may include, for example, a pressure equalization valve coupled with the bypass fluid path 512 and configured to at least partially reduce a pressure differential across compressor 504, or between suction portion 508 and discharge portion 510. Fluid system 506 typically includes heat exchangers (not shown).

Electric motor 502 is controlled by a combination of a motor controller 516, a system controller 518, and, in certain embodiments, a remote device 520. Motor controller 516 includes, for example, power electronics and digital control components for rectifying line frequency power, supplying DC voltage, and inverting, or generating, variable frequency power that is supplied to the stator windings of electric motor 502. Motor controller 516 may further include control components for controlling operation of pressure equalization mechanism 514, such as, for example, a microcontroller and one or more analog components for operating a solenoid to open and close, e.g., a pressure equalization valve. Alternatively, the control components of pressure equalization mechanism 514 may be incorporated into system controller 518, remote device 520, or another device.

System controller 518 communicates with motor controller 516, for example, to transmit and receive commands or information from a user, and to perform system level control of compressor system 500. System controller 518 may include, for example, a thermostat.

Remote device 520 may include a computing device such as a smart phone, a PC, tablet, server, or other computing system suitable for carrying out one or more control or user interface functions for compressor system 500. Remote device 520, system controller 518, and motor controller 516 communicate among each other in a wired or wireless manner using, for example, serial channel, CAN bus, Bluetooth, Wi-Fi, ZigBee, or any other suitable wired or wireless communication protocol. In certain embodiments, motor controller 516, system controller 518, and remote device 520 may be incorporated into a single package with the electric motor 502, or in a single package for the compressor system 500. Motor controller 516, system controller 518, or remote device 520 may, in certain embodiments, be modularly packaged and positioned within the single package, or positioned separate from each other.

Some embodiments involve the use of one or more electronic or computing devices (e.g., for controlling operation of a drive circuit and/or individual components thereof). Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms: processor, processing device, and controller.

In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are examples only and are thus not limiting as to the types of memory usable for storage of a computer program.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   an electric motor of a compressor system, the electric motor comprising:
     a contactor configured to provide line frequency power to the electric motor to drive the electric motor at a full speed; and
     an inverter to provide variable frequency power to the electric motor to drive the electric motor at a variable speed; and
   a controller configured to:
     in accordance with a load condition on the system, determine to operate the electric motor using the line frequency power instead of the variable frequency power from the inverter;
     determine a time to generate a signal to close the contactor by energizing a coil of the contactor at least in part by analyzing previous data corresponding to a delay in closing of the contactor after application of the signal under a corresponding set of operating conditions of the electric motor; and
     initiate transition of the electric motor to operate using the line frequency power instead of the variable frequency power from the inverter by applying the signal to close the contactor at the determined time.

2. The system of claim 1, wherein the controller is further configured to evaluate a set of current operating conditions to determine the time to generate the signal to close the contactor,
   wherein the set of current operating conditions includes one or more of: an ambient temperature, a temperature of the system, a value of line impedance, a contactor coil voltage value, a line voltage value, or an age of the contactor.

3. The system of claim 1, wherein
   the set of operating conditions includes one or more of: an ambient temperature, a temperature of the system, a value of line impedance, a contactor coil voltage value, a line voltage value, or an age of the contactor.

4. The system of claim 3, wherein the delay in closing of the contactor after the signal to close the contactor is applied is measured based on a time difference between a first time at which the signal to close the contactor is applied and a second time at which an electric current flowing through the contactor is detected using a sensor.

5. The system of claim 1, wherein the controller is further configured to:
   prior to transitioning the electric motor to operate using the line frequency power instead of the variable frequency power from the inverter, increase an amplitude of a voltage or a current fed to at least one of a main winding or a start winding of the electric motor during a predetermined number of last cycles of operations using the variable frequency power from the inverter.

6. The system of claim 5, wherein the predetermined number of last cycles is not more than one cycle.

7. The system of claim 1, wherein the controller is further configured to:
   detect closing of the contactor based on a signal indicating a flow of an electric current through a current sensor; and
   based on the signal indicating the contactor is closed, disable the inverter.

8. The system of claim 1, wherein the controller is further configured to:
   detect closing of the contactor based on a signal indicating a flow of an electric current using a shunt resistor added in a path between the inverter and a rectifier connected to a line frequency power supply input; and
   based on the signal indicating the contactor is closed, disable the inverter.

9. The system of claim 1, wherein the controller is further configured to:
   detect closing of the contactor based on a signal indicating a flow of an electric current using a hall-effect current sensor; and
   based on the signal indicating the contactor is closed, disable the inverter.

10. The system of claim 1, wherein the controller is further configured to:
    detect closing of the contactor based on a zero-value voltage difference across two different ends of any one pole of the contactor; and based on the signal indicating the contactor is closed, disable the inverter.

11. A controller of an electric motor configured to:
determine to operate the electric motor using a line frequency power instead of a variable frequency power from an inverter of the electric motor;
determine a time to generate a signal to close a contactor of the electric motor by energizing a coil of the contactor;
initiate transition of the electric motor to operate using the line frequency power instead of the variable frequency power from the inverter by applying the signal to close the contactor at the determined time; and
increase an amplitude of a voltage or a current fed to at least one of a main winding or a start winding of the electric motor during a predetermined number of last cycles of operation using the variable frequency power from the inverter.

12. The controller of claim 11, wherein the controller is further configured to:
analyze at least one of: previous data corresponding to a delay in closing of the contactor after the signal to close the contactor is applied under a set of operating conditions, and a set of current operating conditions; and
in accordance with the analysis, determine the time to generate the signal to close the contactor.

13. The controller of claim 11, wherein the predetermined number of last cycles is not more than one cycle.

14. The controller of claim 11, wherein the controller is further configured to measure a delay in closing of the contactor after the signal to close the contactor is applied, the delay is measured based on a time difference between a first time at which the signal to close the contactor is applied and a second time at which an electric current flowing through the contactor is detected using a sensor.

15. The controller of claim 14, wherein the sensor is a hall-effect current sensor.

16. The controller of claim 11, wherein the controller is further configured to:
detect closing of the contactor based on,
a signal indicating a flow of an electric current through a current transformer, or
a signal indicating the flow of the electric current using a shunt resistor added in a path between the inverter and a rectifier connected to a line frequency power supply input; and
based on the signal indicating the flow of the electric current, disable the inverter.

17. The controller of claim 11, wherein the controller is further configured to:
detect closing of the contactor based on a zero-value voltage difference across two different ends of any one pole of the contactor; and
based on the signal indicating the contactor is closed, disable the inverter.

18. A method comprising:
determining to operate an electric motor using a line frequency power instead of a variable frequency power from an inverter of the electric motor;
determining a time to generate a signal to close a contactor of the electric motor by energizing a coil of the contactor at least in part by analyzing previous data corresponding to a delay in closing of the contactor after application of the signal under a corresponding set of operating conditions of the electric motor; and
causing transition of the electric motor to operate using the line frequency power instead of the variable frequency power from the inverter by applying the signal to close the contactor at the determined time.

* * * * *